(No Model.)
H. BAILEY & W. L. GILSON.
GRAIN SEPARATOR.
No. 525,067. Patented Aug. 28, 1894.
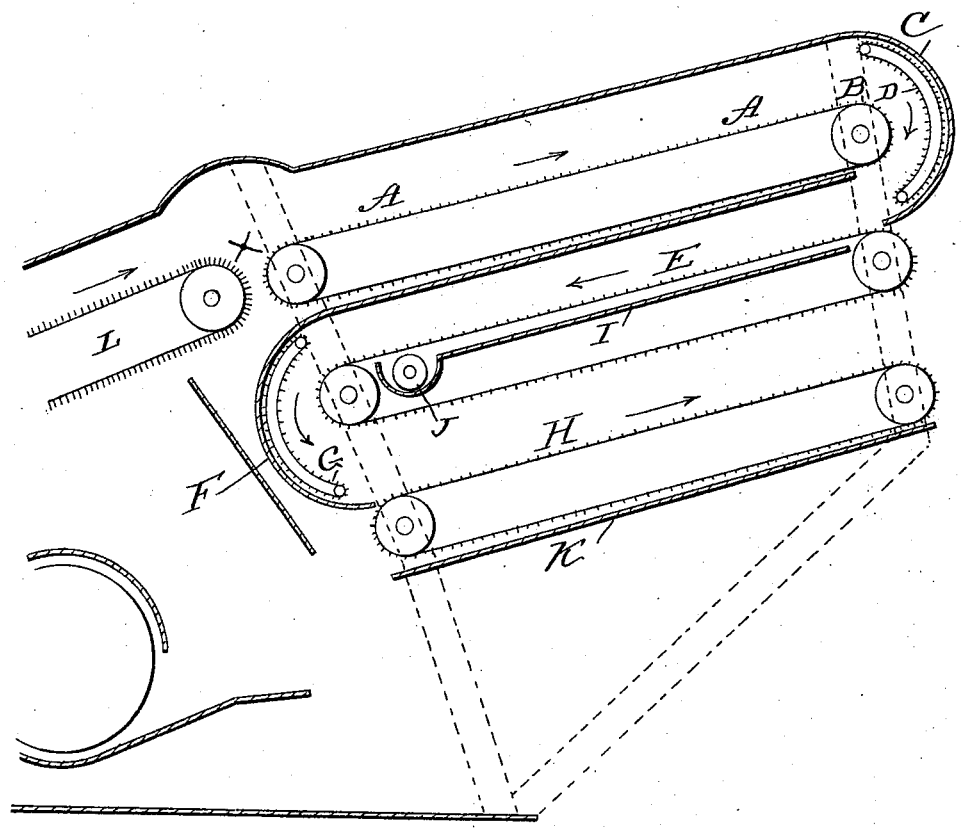
Attest
Walter Maldon
Wm. T. Hall
Inventors
Hezekiah Bailey
William L. Gilson
by F. L. Middleton
Asso. Atty
THE NORRIS PETERS CO., PHOTO-LITHO., WASHINGTON, D. C.

UNITED STATES PATENT OFFICE.

HEZEKIAH BAILEY AND WILLIAM LORENZO GILSON, OF SHERIDAN, OREGON.

GRAIN-SEPARATOR.

SPECIFICATION forming part of Letters Patent No. 525,067, dated August 28, 1894.

Application filed September 19, 1893. Serial No. 485,765. (No model.)

*To all whom it may concern:*

Be it known that we, HEZEKIAH BAILEY and WILLIAM LORENZO GILSON, citizens of the United States, residing at Sheridan, in Yamhill county and State of Oregon, have invented a new and useful Improvement in Grain-Separators for the Better and More Perfect Separation of Grain from Straw, of which the following is a full, clear, and exact description.

The object of our invention is to provide, in grain separators, a device for a more complete separation of grain from straw, by taking the straw at a point where it is usually discharged from grain separators, and returning it, with the usual agitation, toward the cylinder, on a carrier, and then again returning it, over another carrier, to the rear of the machine where the same is discharged, as will be hereinafter fully described and then claimed.

Reference is to be had to the accompanying drawing, forming a part of this specification, in which similar letters of reference indicate corresponding parts in the figure.

In the drawing the figure shows a side view of the rear portion of a grain separator, to which our device has been applied, casing being torn away.

A A represents the straw-carrier that is usually found in grain separators.

B shows the point at the rear end of straw-carrier, A, where the material is usually discharged from the separator.

C is a concave casing, which, with the concaved faced endless carrier D, is designed to turn the material on to another carrier E, placed either under or above the carrier A A, and turn it back, toward the cylinder to another concave casing F, which, with the concave faced endless carrier G, is designed to turn the material on to another carrier H, below carrier E, by which the material, with sufficient agitation, is conveyed to the rear end of the separator and there discharged. Immediately under the upper part of carrier E, is placed a tight floor I designed to catch any grain separated from the carrier E, in its passage from casing C to casing F.

J represents a recess at the end of floor I in which is placed a conveyer, used to carry any grain, collected from floor I, to any desired part of the machine. Immediately under the carrier H is placed another tight floor K, designed to catch any grain separated from the straw on carrier H in its passage from casing F to the rear end of the separator where the straw is discharged.

The darts show the direction in which the material is being carried in different parts of the grain separator.

We have shown for convenience the concave faced endless carriers as arranged to carry the material from the carriers A E, downward but we wish it understood that we do not limit ourselves to this arrangement as a mere reversal of the arrangement and action would not depart from the spirit of our invention.

We claim—

In a grain separator the combination of the forwardly moving endless carriers, A. H, one below the other, the concave casings C, F, the concave-faced endless carriers, D, G, and the intervening backwardly-moving endless carrier, E, substantially as set forth.

In testimony that we claim the foregoing as our own we have hereto affixed our signatures in presence of two witnesses.

HEZEKIAH BAILEY.
WILLIAM LORENZO GILSON.

Witnesses:
CHAS. H. HALE,
C. C. LINDEN.